United States Patent [19]

Bottoms et al.

[11] Patent Number: 5,559,792
[45] Date of Patent: *Sep. 24, 1996

[54] SOUND MODIFICATION FOR USE IN SIMULTANEOUS VOICE AND DATA COMMUNICATIONS

[75] Inventors: Stanley Bottoms, Seminole; Gordon Bremer; Kenneth D. Ko, both of Clearwater; Luke J. Smithwick, New Port Richey, all of Fla.

[73] Assignee: Lucent Technologies Inc., Murray Hill, N.J.

[ * ] Notice: The term of this patent shall not extend beyond the expiration date of Pat. No. 5,448,555.

[21] Appl. No.: 230,565

[22] Filed: Apr. 20, 1994

[51] Int. Cl.⁶ .................................................. H04J 11/00
[52] U.S. Cl. ............................ 370/20; 370/24; 381/61; 375/222
[58] Field of Search ............................ 370/24, 20, 71, 370/73, 76, 29, 30, 79, 37, 36; 381/61–65; 395/2.76, 2.77; 364/410; 379/93, 96; 375/222, 261

[56] References Cited

U.S. PATENT DOCUMENTS

| | | | |
|---|---|---|---|
| 4,400,591 | 8/1983 | Jennings et al. | 381/61 |
| 4,683,588 | 7/1987 | Goldberg | 381/61 |
| 4,891,806 | 1/1990 | Farias et al. | 375/39 |
| 4,944,014 | 7/1990 | Stella | 381/61 |
| 5,022,053 | 6/1991 | Chung et al. | 375/39 |
| 5,292,125 | 3/1994 | Hochstein et al. | 364/410 |
| 5,359,644 | 10/1994 | Tanaka et al. | 379/96 |
| 5,448,555 | 9/1995 | Bremer et al. | 370/20 |

OTHER PUBLICATIONS

Co–Pending, commonly assigned, U.S. Patent application of Bremer et al., entitled "Companding of Voice Signal for Simultaneous Voice and Data Transmission," Ser. No. 08/076506, filed on Jun. 14, 1993.

European Search Report dated Jul. 27, 1995, regarding EPO Application No. EP95302426.2.

*Primary Examiner*—Benedict V. Safourek
*Assistant Examiner*—Chau T. Nguyen
*Attorney, Agent, or Firm*—Joseph J. Opalach

[57] ABSTRACT

A simultaneous voice and data (SVD) communications system includes an SVD modem at either endpoint of the system. Each SVD modem provides an SVD signal to the opposite endpoint, where this SVD signal includes both a voice channel and a data channel. One, or both, of these SVD modems allows the respective user to alter either the voice signal that is provided to that user, or the voice signal that is transmitted from that user, via the voice channel of the SVD signal, to the opposite SVD endpoint.

12 Claims, 2 Drawing Sheets

SOUND MODIFICATION FOR USE IN SIMULTANEOUS VOICE AND DATA COMMUNICATIONS

BACKGROUND OF THE INVENTION

The present invention relates to data communications equipment and, more particularly, to a communications system involving simultaneous voice and data modems.

The co-pending, commonly assigned, U.S. Patent application of Bremer et al. entitled "Simultaneous Analog and Digital Communication," Ser. No. 8/076505, filed on Jun. 14, 1993, U.S. Pat. No. 5,448,555, describes a simultaneous voice and data communications system in which a voice signal is added to a data signal for transmission over a communications channel to a receiving modem.

In this simultaneous analog and digital communication system, the data signal to be transmitted is represented by a sequence of data symbols, where each data symbol is associated with a particular N-dimensional signal point value taken from a signal space. Similarly, the analog signal, which is represented by a voice signal, is processed so that it is mapped into the N-dimensional signal space to provide a voice signal point. This voice signal point defines the magnitude and angle of a voice signal vector about the origin of the signal space. The data symbol and the voice signal vector are then added together to select a resultant N-dimensional signal point, which is then transmitted to a far-end modem.

Upon reception of the transmitted N-dimensional signal point, the receiver of the far-end modem detects the embedded data symbol and subtracts the data symbol from the received N-dimensional signal point to yield the voice signal vector. This voice signal vector is then used to recreate the voice signal.

As a result, this technique advantageously provides a voice-band signal that has both an audio channel and a data channel. This allows two users with simultaneous voice and data (SVD) capable modems to communicate data between them and talk at the same time—yet only requires one "tip/ring" type telephone line at each user's location. As in any communications system that includes a voice signal, the characteristics of the SVD signal are normally chosen to optimize the voice quality of the SVD voice channel. That is, higher quality voice transmission is sought. For example, the co-pending, commonly assigned, U.S. Patent application of Bremer et al., entitled "Companding of Voice Signal for Simultaneous Voice and Data Transmission," Ser. No. 08/076506, filed on Jun. 14, 1993, describes a simultaneous voice and data communications system in which a voice signal is companded before application to the PSTN to improve the quality of the voice transmission.

SUMMARY OF THE INVENTION

Since the above-described technique advantageously allows two people to both talk and exchange data over a single telephone connection, one application of this technology is in the area of entertainment, i.e., modem-based games, where now two people can not only play a game via the data channel but can also talk to each other at the same time via the voice channel of a simultaneous voice and data (SVD) connection. As noted above, the quality afforded by the SVD voice channel is typically a concern of any voice communications system. However, we have realized a technique that enhances the level of entertainment in an SVD communications system—yet effectively deteriorates the quality of the actual voice signal. In particular, an SVD modem is provided that allows an SVD user to deliberately alter the voice signal provided by the SVD modem. As a result, the players of a modem-based game can aurally enhance the game environment by providing sound effects, for example, modifying the sound of the voice or adding background noise.

DETAILED DESCRIPTION

Figure 1:
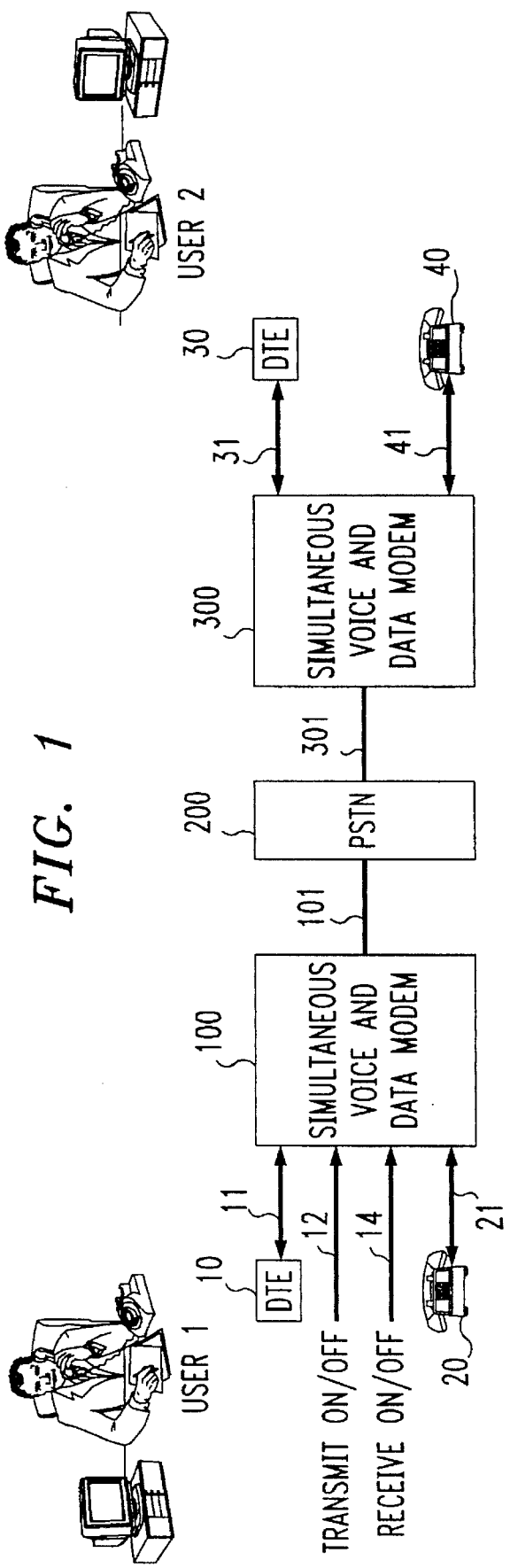
FIG. 1 shows a block diagram of a simultaneous voice and data communications system embodying the principles of the invention.

A block diagram of a simultaneous voice and data communications system embodying the principles of the invention is shown in FIG. 1. In the description that follows it is assumed that a communications path has already been established between user 1 and user 2 of FIG. 1. The communications equipment of user 1 includes data terminal equipment (DTE) 10, e.g., a computer; telephone 20, which represents voice equipment; and simultaneous voice and data (SVD) modem 100. The latter receives two types of signals for transmission to SVD modem 300—a data signal from DTE 10 and a voice signal from telephone 20. In addition to the voice and data signals to be transmitted to far-end SVD modem 300, SVD modem 100 also receives two control-type signals from user 1—transmit on/off signal on line 12 and receive on/off signal on line 14. These lines are also referred to as a "signaling port." As described further below, these signals each represent a simple switch with multiple positions that controls whether or not there is any modification to either the transmitted or received voice signals, respectively. When either of these signals represent the "off" condition, there is no modification of the respective voice signal. When either of these signals represent the "on" condition, the signal is representative of K–1 switch positions. SVD modem 100 encodes both the data signal and the voice signal to provide a combined voice and data signal for transmission, via local loop 101, public switched telephone network (PSTN) 200, and local loop 301, to SVD modem 300. The basic operation of a simultaneous voice and data modem, other than the inventive concept, is described in the above-mentioned Bremer et al. patent application entitled "Simultaneous Analog and Digital Communication," Ser. No. 08/076505, filed on Jun. 14, 1993. SVD modem 300 receives the combined voice and data signal transmitted by SVD modem 100 and provides the data signal to DTE 30, and the voice signal to telephone 40. Transmission of data and voice signals in the opposite direction, i.e., from SVD modem 300 to SVD modem 100, occur in a like fashion. In the description that follows only SVD modem 100 is described. SVD modem 300 may, or may not, incorporate the inventive concept. Further, it should be noted that although the invention is described below in the context of the transmitting and receiving portions of SVD modem 100, the inventive concept does not require that both the transmit and receive portions of a modem incorporate the inventive concept.

Figure 2:
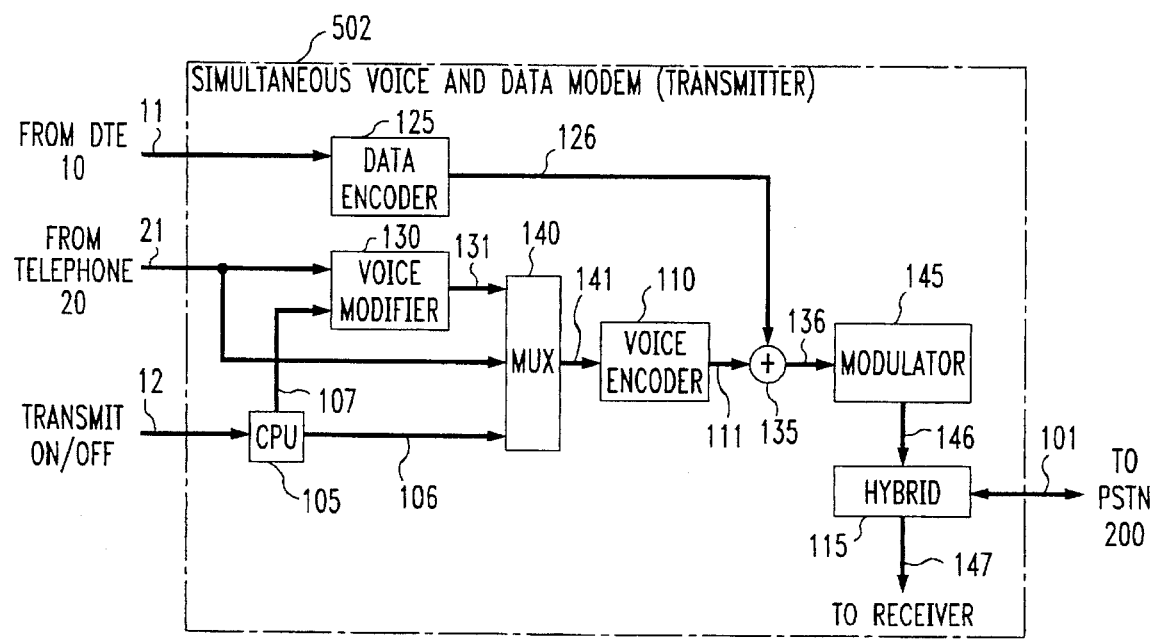
FIG. 2 shows a block diagram of the transmitter portion of a simultaneous voice and data modem embodying the principles of the invention.

Reference should now be made to FIG. 2, which shows a block diagram of transmitter 502 of SVD modem 100. Other than the inventive concept, the individual components of SVD modem 100 are well-known and are not described in detail. For example, CPU 105 is a microprocessor-based central processing unit and associated memory for storing program data.

DTE 10 of FIG. 2 provides a data signal to data encoder 125, which includes any of the well-known encoding techniques like scrambling, trellis-coding, etc., to provide a sequence of symbols on line 126 at a symbol rate, 1/T. The symbols are selected from a signal space (not shown). It is assumed that DTE 10 represents a computer, e.g., a personal computer that is executing a game program, which user 1 is playing.

In accordance with the inventive concept, telephone 20 of FIG. 2 provides a voice signal to voice modifier 130 and multiplexer (mux) 140. The output signal of mux 140 is controlled by user 1 via the transmit on/off signal provided by line 12. This signal is applied to CPU 105. For the purposes of this example, it is assumed that line 12 is also representative of a simple switch with multiple positions such that the transmit on/off signal is representative of K switch positions, where the first switch position represents "off," i.e., no modification of the voice signal and each of the remaining K–1 switch positions are each associated with a different type of affect on the voice signal provided by telephone 20 (described below). If the transmit on/off signal represents the "off" position, then CPU 105 controls mux 140 so that the output signal on line 141 represents the actual voice signal from telephone 20 on line 21. However, if the transmit on/off signal represents any of the other remaining switch positions, then CPU 105 switches the output signal of mux 140 from the voice signal on line 21 to the output signal provided by voice modifier 130 on line 131. In addition, CPU 105 applies a control signal to voice modifier 130 via line 107. This control signal causes voice modifier 130 to distort the voice signal from telephone 20 in accordance with the selected switch position. It should be noted that although this embodiment is shown using mux 140 to switch between the voice signal from telephone 20 and the voice modified signal on line 131, other alternatives are possible. For example, mux 140 can be eliminated by always applying the output signal from voice modifier 130 to voice encoder 110. In this instance, the "off" switch position simply causes voice modifier 130 to not distort the applied voice signal from telephone 20.

Mux 140 applies an output signal to voice encoder 110, which provides a sequence of two-dimensional signal points, at the predefined symbol rate of 1/T symbols per sec., on line 111. Each two-dimensional signal point represents a "voice signal vector" about the origin of a signal space (not shown). Adder 135 adds each voice signal vector on line 111, if any, to a respective one of the symbols provided by data encoder 125 to provide a stream of signal points to modulator 145. The latter functions in accordance with the well-known quadrature amplitude modulation (QAM) to provide a transmit signal to hybrid 115 for transmission to SVD modem 300 via PSTN 200.

Figure 3:
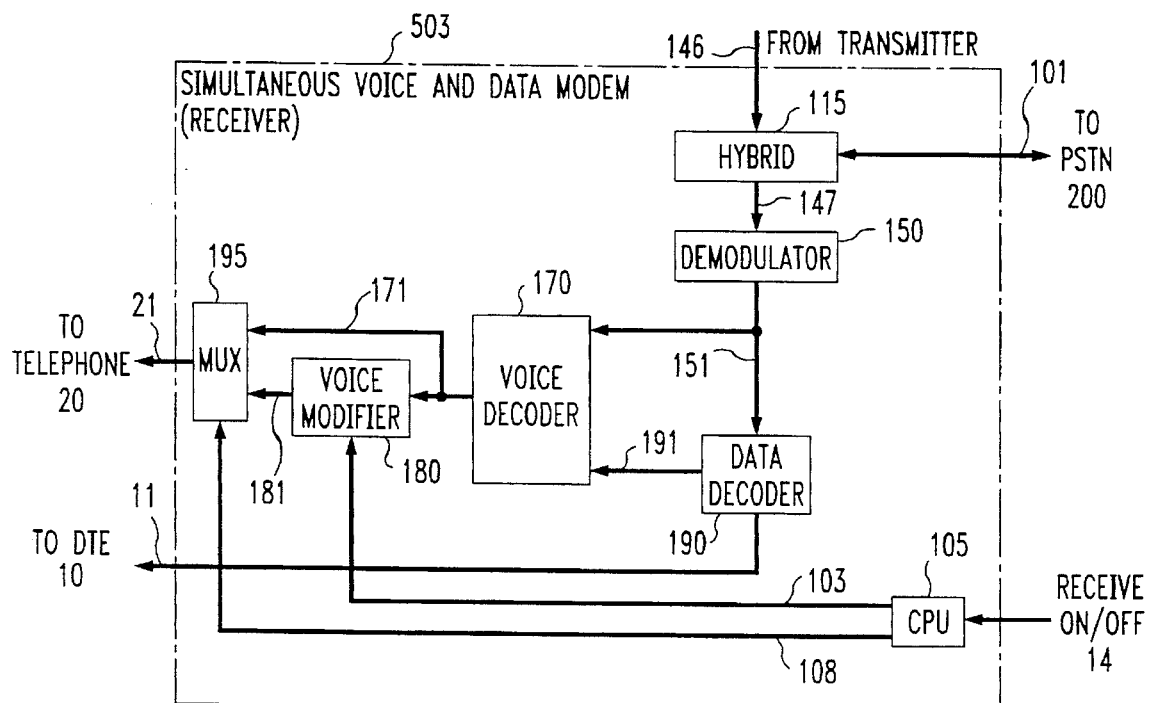
FIG. 3 shows a block diagram of the receiver portion of a simultaneous voice and data modem embodying the principles of the invention.

Receiver 503 of SVD modem 100 performs complementary functions to transmitter 502 described above and is shown in block diagram form in FIG. 3. Common elements in receiver 503 and transmitter 502 have the same reference numeral, e.g., CPU 105, hybrid 115, etc. Hybrid 115 receives a transmitted signal from SVD modem 300, via PSTN 200, and applies this received signal to demodulator 150. The latter provides a received signal point sequence to data decoder 190, which performs the inverse function of data encoder 125 of transmitter 502 to provide an information-bearing signal each symbol period to DTE 10 via line 11.

The input signals of voice decoder 170 include both the received signal point sequence from demodulator 150 and the decoded symbol sequence from data decoder 190. Voice decoder 170 includes suitable buffering to allow for the decoding time needed by data decoder 190 to make a decision as to a received symbol. Voice decoder 170 subtracts the received symbol provided by data decoder 190 from the respective received signal point provided by demodulator 150 and then performs the inverse function of voice encoder 110 to provide the received voice signal on line 171. The received voice signal is applied to multiplexer (mux) 195 and voice modifier 180. Mux 195 provides an output voice signal to telephone 20.

The output signal of mux 195 is controlled by user 1 via the receive on/off signal provided by line 14. This signal is applied to CPU 105. Like line 12, it is assumed that line 14 is also representative of a simple switch with multiple positions such that the receive on/off signal is representative of K switch positions, where the first switch position represents "off," i.e., no modification of the received voice signal and each of the remaining K–1 switch positions are each associated with a different type of affect on the received voice signal (described below). If the receive on/off signal represents the "off" position, then CPU 105 controls mux 195 so that the output signal on line 21 represents the received voice signal from SVD modem 300. Note, however, that this received voice signal could itself have been altered by SVD modem 300 if it also embodied the inventive concept. On the other hand, if the receive on/off signal represents any of the other remaining switch positions, then CPU 105 switches the output signal of mux 195 from the output signal of voice decoder 170 to the output signal provided by voice modifier 180. In addition, CPU 105 applies a control signal to voice modifier 180 via line 103. This control signal causes voice modifier 180 to distort the voice signal from telephone 20 in accordance with the selected switch position. It should be noted that although this embodiment is shown using mux 195 to switch between the output signal of voice decoder 170 and the output signal of voice modifier 180, other alternatives are possible. For example, mux 195 can be eliminated by always applying the output signal from voice modifier 180 to telephone 20. In this instance, the "off" switch position simply causes voice modifier 180 to not distort the received voice signal provided by voice decoder 170.

Transmit on/off signal and receive on/off signals provided by lines 12 and 14, respectively, allow user 1 to deliberately alter the actual speech signal in real time thus giving alternative characteristics for different game characters and/or effects. As used herein the term "sound effects" means either modifying an input signal or adding to the input signal. For example, one sound effect may be altering the voice of user 1 to sound more in line with a character-type from a "role-playing" game (rpg). Another sound effect is background noise, e.g., static, or explosion-type sounds, added to the voice signal to give the effect of distance, or combat. Further, these modifications may be time-invariant, or varied from time-to-time, e.g., static sounds can fade in and out. A rate of change for varying sound effects can be user-selected.

Voice modifiers 130 and 180 are representative of sound generators that modify the applied input signal on lines 21 and 171, respectively, and/or add a background noise signal to simulate events occurring in a corresponding game being played on DTE 10. Voice modifiers 130 and 180 provide any number of well-known voice modification effects, e.g., a) fixed or time varying frequency translation;

b) fixed or time varying amplitude variation;

c) fixed or time varying companding d) fixed or time varying low frequency cutoff frequency;

e) fixed or time varying high frequency cutoff frequency;

f) fixed or time varying additive sounds; and g) fixed or time varying frequency inversions.

As illustration, voice modifiers 130 and 180 can each be a simple filter where the selection of a sound effect varies the pass-band by changing the lower and upper cutoff frequencies. A simple filter can be implemented in discrete electronic components as known in the art, or a filter function can be implemented by programming a digital signal processor. The latter provides more flexibility in providing the other above-mentioned sound effects, e.g., changing the amplitude of the voice signal as a function of frequency or shifting the entire voice signal up and down in frequency, etc.

The above-described inventive concept thus allows for the voice signal in either direction to be deliberately altered by an SVD user.

Further, although the above embodiment described the manual selection by the user of one of a number of predefined sound effects. It should be realized that the sound effect selection could be performed by a computer executing the game software. Indeed, the game software could synchronously alter the type of voice modification to the current game condition in real-time. In one example, the game software, executing on DTE 10, controls the selection of the sound effects via the data terminal equipment interface of line 11 through the use of the "command mode" of the SVD modem. In this case, a new set of modem commands is defined that allow the game software, or the user, to select a particular sound effect. In another example, DTE 10 controls the sound effect selection by directly coupling to the signaling port represented by lines 12 and 14 (not shown).

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the invention is illustrated herein as being implemented with discrete functional building blocks, e.g., encoders, decoders, voice modifiers, etc., the functions of any one or more of those building blocks can be carried out using one or more appropriate programmed processors, e.g., a digital signal processor. In addition, the voice modifier function could also be placed after the voice encoder, or simply the voice encoder function itself could be altered so that it provides the desired level of distortion of the voice signal.

In addition, although the above embodiment assumed that there were a fixed number of predefined sound effects, the values of any parameters used by the voice modifier could be initialized and provided to a simultaneous voice and data modem via the data terminal equipment interface, e.g., through the command mode, by the user or by the game software that is executing on the user's data terminal equipment. For example, the user could program the SVD sound effect switch settings by specifying any required parameters like cut-off frequency, amount of frequency shift, or translation, etc. This allows the user to differ the sound effects depending upon the game. Similarly, any voice modification parameters could be provided via the remote simultaneous voice and data modem, e.g., via a secondary modem channel.

We claim:

1. A modem comprising:

a data port for receiving a data signal from data terminal equipment;

a voice port for receiving a voice signal from voice terminal equipment;

a line port for coupling a modulated signal to a communications channel;

means for selecting one of a number of sound effects;

means for modifying the voice signal in accordance with the selected sound effect;

means for combining the modified voice signal and the data signal to provide a combined signal; and modulation means for modulating the combined signal to provide the modulated signal to the communications channel.

2. The apparatus of claim 1 wherein the modulated signal is a simultaneous voice and data signal.

3. Apparatus comprising:

means for encoding a data signal;

means for selecting one of a number of sound effects;

means responsive to the selected sound effect for encoding a voice signal to provide a modified voice signal; and means for simultaneously transmitting the modified voice signal and the encoded data signal to a remote endpoint;

wherein the encoded data signal represents a sequence of data symbols, and the modified voice signal represents a sequence of voice signal points, and the means for transmitting includes means for adding the encoded data signal to the modified voice signal so that one of the sequence of voice signal points is added to a respective one of the sequence of data symbols.

4. The apparatus of claim 3 wherein the voice signal represents a person's voice and the selected sound effect alters the person's vocal characteristics.

5. The apparatus of claim 3 wherein the voice signal represents a person's voice and the selected sound effect adds a background sound to the voice signal.

6. The apparatus of claim 3 wherein the means responsive to the selected sound effect further includes:

means for modifying the voice signal in accordance with the selected sound effect to provide an output signal; and voice encoding means for encoding the output signal to provide the modified voice signal.

7. A modem comprising:

a data port for providing a data signal to data terminal equipment;

a voice port for providing a modified voice signal to voice terminal equipment;

a line port for receiving a modulated signal from a communications channel;

means for selecting one of a number of sound effects;

means for demodulating the received modulated signal to provide a first signal;

means for decoding the first signal to provide the data signal and a received voice signal; and means for modifying the received voice signal in accordance with the selected sound effect to provide the modified voice signal.

8. The apparatus of claim 7 wherein the modulated signal is a simultaneous voice and data signal.

9. A modem comprising:

means for demodulating a received signal to provide a received data signal;

means for decoding the received data signal to provide a data signal and a data symbol;

means for recovering a received voice signal from the received data signal and the data symbol;

means for selecting one of a number of sound effects; and means for modifying the received voice signal as a function of the selected sound effect to provide a modified voice signal.

10. The apparatus of claim 9 wherein the received voice signal represents a person's voice and the selected sound effect alters the person's vocal characteristics.

11. The apparatus of claim 9 wherein the received voice signal represents a person's voice and the selected sound effect adds a background sound to the received voice signal.

12. A method for use in a modem, the method comprising the steps of:

receiving in the modem a simultaneous voice and data signal;

decoding the simultaneous voice and data signal to provide a voice signal and a data signal;

providing the data signal to data terminal equipment;

selecting one of a number of sound effects;

modifying the voice signal as a function of the selected sound effect; and providing the modified voice signal to voice terminal equipment.

* * * * *